July 28, 1964 KINJIRO OHASHI 3,142,491
CHUCK FOR A MACHINE TOOL
Filed Dec. 22, 1961

3,142,491
CHUCK FOR A MACHINE TOOL
Kinjiro Ohashi, 21 Nagara-Nishitori, 2-chome, Oyodo-ku, Osaka, Japan
Filed Dec. 22, 1961, Ser. No. 161,678
3 Claims. (Cl. 279—4)

This invention relates to a chuck for a machine tool, such as a lathe.

The conventional chuck for a lathe heretofore used is usually provided with three radially movable jaws operated manually or by means of a pressure fluid actuated device. When such chuck is used to hold a hollow cylindrical blank having a relatively thin wall, for instance a bearing race, there is a tendency to produce deformation of the cylindrical blank at the points grasped by the jaws, whereby a precisely accurate machining can not be produced. Such drawback likewise could not be avoided where the chuck jaws grasp the wall of the hollow cylindrical blank from the inside thereof. To remove such defect, it has been proposed to provide more than three jaws, but in such case a difficulty would be encountered in the centering of the cylindrical blank.

One object of this invention is to provide an improved chuck which may be safetly used without causing any deformation of the blank being grasped by the jaws. Another object is to provide such chuck whereby the centering of the cylindrical blank may be readily and accurately effected.

The chuck according to this invention comprises a plurality of main jaws slidable radially toward and away from a blank, a plurality of auxiliary jaws slidable radially toward and away from the blank, each auxiliary jaw being arranged between two adjacent main jaws, a pressure fluid actuated main device, means actuated by said pressure fluid actuated main device for operating said main jaws, a plurality of auxiliary pressure fluid actuated devices connected to said main pressure fluid actuated device through a plurality of branch fluid conduits, and means connected to each of said auxiliary pressure fluid actuated devices for operating each of said auxiliary jaws. In the branch conduit connected to each auxiliary pressure fluid actuated device, there is provided means for restricting the flow of the pressure fluid to said auxiliary pressure fluid actuated device, so that the operation of the said auxiliary jaws is retarded relative to the operation of the main jaws.

The accompanying drawing will serve to illustrate specific embodiments of my invention, in order that is utility and functioning will be thoroughly appreciated. It will be understood, however, that these are by way of illustration only and are not to be taken as limiting the invention in any way. In the drawings.

Figure 1:
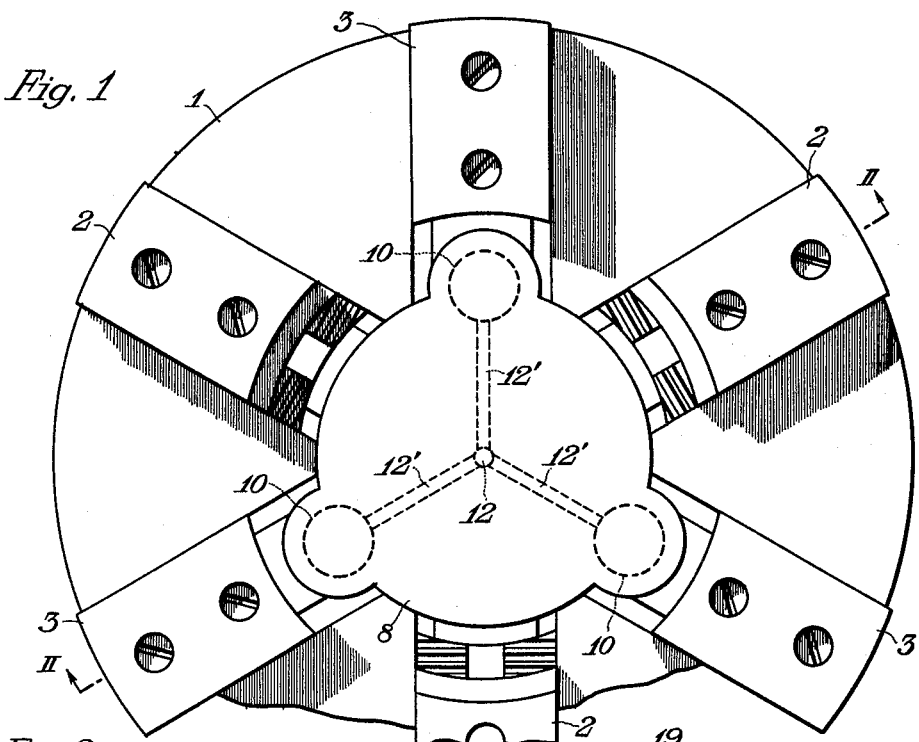
FIGURE 1 is a plan view, partly broken away, showing the chuck constructed according to this invention.

Referring now to the drawing, the reference numeral 1 designates a chuck proper, on which are provided three main jaws 2 each adapted to slide in a guide channel formed in the chuck proper 1. There are three auxiliary jaws 3, each of which is positioned between two adjacent main jaws 2, as shown in FIGURE 1. 4 is a movable cylinder having a boss 4' arranged in a central bore 5 formed in the chuck proper 1 and adapted to be operated under fluid pressure. Abutting against said boss 4' of the cylinder, there is a rotary valve 6 communicating with an oil passage 7 in the boss 4', through which passage fluid under pressure from a source of pressure oil is introduced into or discharged from the interior of said movable cylinder. Said rotary valve 6 serving for controlling the supply and discharge of oil under pressure, is not herein shown or described in detail, as it forms no part of the present invention.

A stationary piston 8 having a packing 9 is securely mounted in the chuck proper 1 and cylinder 4 is slidable relative to the piston 8. On the enlarged head of the stationary piston 8, there are three cylinders 10 fixed thereto or formed integral therewith, each cylinder 10 having a movable piston 11 serving to control the auxiliary jaws 3, each of which is arranged between two adjacent main jaws 2 as shown in FIGURE 1. The stationary piston 8 is provided with a central oil conduit 12 which opens into the interior of cylinder 4 in a position such that it is never obstructed by relative movement between the cylinder 4 and piston 8, and three radial branch conduits 12' forming continuations of said central conduit 12. Each radial branch conduit 12' communicates with the oil space in the cylinder 10.

Figure 2:
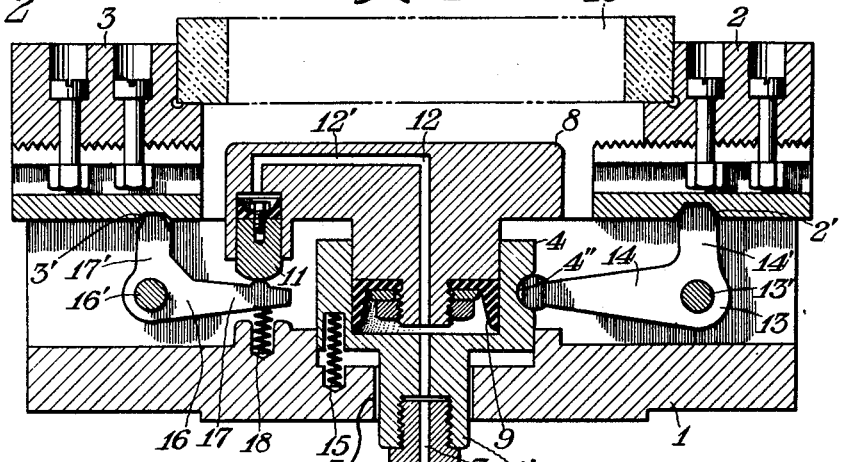
FIGURE 2 is a vertical section taken along line II—II of FIGURE 1.

A bell crank lever 13 is pivoted as at 13' on the chuck proper 1, and the free end of one arm 14 thereof engages with a recess 4" formed on the outer wall of the cylinder 4, while the free end of the other arm 14' engages with a recess 2' formed on the base of the main jaw 2, as shown in FIGURE 2. The cylinder 4 is normally biassed upwardly by means of a spring 15. A bell crank lever 16 is pivoted as at 16' on the chuck proper 1, and one arm 17 thereof is biassed upwardly by means of a spring 18 and engages with the lower end of the piston 11. The free end of the other arm 17' of said lever 16 engages with a recess 3' formed in the base of the auxiliary jaw 3.

While, in the embodiment shown, one auxiliary jaw 3 is arranged between two adjacent main jaws 2, the chuck may be modified by providing two or more auxiliary jaws between two adjacent main jaws.

When a hollow cylindrical blank 19 (shown in chain lines) to be machined is placed in the space surrounded by the chuck jaws, the rotary valve 6 is opened to introduce oil or other pressure fluid through the passage 7 into the oil space in the cylinder 4, whereby the main cylinder 4 will first be pressed down against the action of the spring 15. Accordingly, the inner arm 14 of each bell crank lever 13 will be turned downwardly, turning thereby the upper arm 16' inwardly. In response to the above mentioned operation the main jaws 2 will be slid inwardly and they will apply inwardly acting pressure upon the outer wall of the cylindrical blank 19, thereby firmly holding the blank. At the same time, pressure oil will be forced into each auxiliary cylinder 10 through the central oil conduit 12 and the radial branch conduits 12', and due to the pressure drop along conduit 12 and branch conduits 12', only after the pressure in cylinder 4 builds up when jaws 2 encounter the blank 19 will each auxiliary piston 11 be moved against the action of the spring 18. Accordingly, the upper arm 17' of the bell crank lever 16 will be turned inwardly, whereby the auxiliary jaws 3 will be slid inwardly, and they will apply inwardly acting pressure upon the outer wall of the cylindrical blank 19.

When the machining operation is finished, the pressure oil is released by means of conventional discharge device (not shown), whereby the main jaws 2 as well as the auxiliary jaws 3 are returned to their retracted positions by the action of the springs 15 and 18 respectively.

While the jaws 2 and 3 are shown as being inwardly moved to the operative position, it is to be understood that the jaws may be arranged to be outwardly moved to the operative position pressing outwardly against the inner wall of the hollow cylindrical blank.

Figures 3, 4:
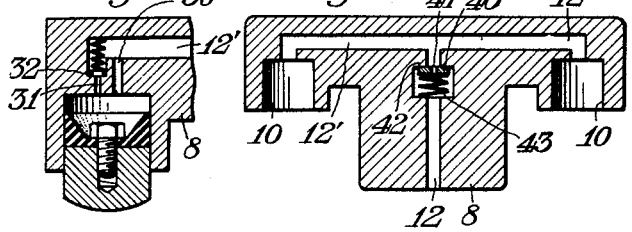
FIGURE 3 is a vertical section showing a modified form of a part of a pressure oil conduit for controlling the auxiliary jaws.
FIGURE 4 is a vertical section showing a still further modified form of a part of a pressure oil conduit for controlling the auxiliary jaws.

In the modified form of the embodiment shown in FIGURE 3, the radial oil conduit 12' and the oil space in the auxiliary cylinder 10 are in communication through a restriction in the branch conduit 12', here shown in the form of a restricted passage 30 and a relief opening 31, the latter being normally closed by means of a check valve 32. It will be seen that in this embodiment the operation of the auxiliary piston 11 is retarded relative to the operation of the main cylinder 4 by reason of the provision of the restricted oil passage 30, and that it is so arranged that the auxiliary jaws 3 act after the centering of the cylindrical blank 19 is finished by the preceding operation of the main jaws 2. At the time of releasing jaws, oil in the auxiliary cylinder 10 will return through both restricted oil passage 30 and the relief opening 31, so that no excessive resistance is given to the returning oil.

Instead of providing said restricted oil passage 30 and the normally closed relief opening 31 in each of the radial branch conduit 12', only a single restriction for the same purpose may be provided in the central oil conduit 12 in the head of the main piston 8, as shown in FIGURE 4. In this embodiment, in the central oil conduit 12 there is provided a disc 40 having a restricted orifice 41 which normally abuts against a valve seat 42 under the action of a spring 43. The function of this device will be apparent to those skilled in the art.

What I claim is:

1. A chuck for a machine tool, comprising a chuck body, a plurality of main jaws slidably mounted on said body for radial sliding toward and away from the central axis of the chuck body, a plurality of auxiliary jaws slidably mounted on said body for radial sliding toward and away from the said central axis, at least one auxiliary jaw between each two adjacent main jaws, a stationary piston, a movable cylinder slidable on said piston and having a single connection opening into said piston and adapted to be connected to a source of pressure fluid, means coupled to said movable cylinder and to said main jaws for operating said main jaws during movement of said cylinder, a plurality of stationary cylinders and movable pistons in each of said cylinders, conduit means including branch fluid conduits extending between said movable cylinder and each of said stationary cylinders with the branch conduits opening into said stationary cylinders, with the end of the conduit means opening into said movable cylinder through the end of said stationary piston, and means coupled to each of said movable pistons and to said auxiliary jaws for operating said auxiliary jaws during movement of said movable pistons.

2. A chuck as claimed in claim 1 in which each branch fluid conduit further has a restriction therein.

3. A chuck as claimed in claim 1 in which said stationary piston has a central fluid conduit extending partly therethrough from the end thereof within said movable cylinder, said branch conduits extending from the end of the central fluid conduit remote from the movable cylinder, and said central fluid conduit further having a flow restricting means therein, said flow restricting means consisting of a valve seat and a spring biased disc having a restricted orifice therein and abutting said valve seat.

References Cited in the file of this patent

UNITED STATES PATENTS

| | | |
|---|---|---|
| 2,703,242 | Sloan | Mar. 1, 1955 |
| 2,736,563 | Work | Feb. 28, 1956 |
| 2,814,496 | Damijonaitis | Nov. 26, 1957 |
| 2,832,604 | Le Brusque | Apr. 29, 1958 |